United States Patent
Karlstad et al.

(10) Patent No.: US 12,451,526 B2
(45) Date of Patent: Oct. 21, 2025

(54) ELECTROLYTE SENSOR FOR SENSING ELECTROLYTE CREEPAGE IN A BATTERY

(71) Applicant: SAFT GROUPE SA, Levallois-Perret (FR)

(72) Inventors: Marcus Karlstad, Oskarshamn (SE);
Rune Sjövall, Södra Sandby (SE);
Robert Alexandersson, Gunnebo (SE);
Roger Fransson, Oskarshamn (SE);
Alexander Moberg, Oskarshamn (SE);
Miroslav Andel, Oskarshamn (SE)

(73) Assignee: SAFT GROUPE SA, Levallois-Perret (FR)

( * ) Notice: Subject to any disclaimer, the term of this patent is extended or adjusted under 35 U.S.C. 154(b) by 691 days.

(21) Appl. No.: 17/782,427

(22) PCT Filed: Dec. 6, 2019

(86) PCT No.: PCT/IB2019/001385
§ 371 (c)(1),
(2) Date: Jun. 3, 2022

(87) PCT Pub. No.: WO2021/111165
PCT Pub. Date: Jun. 10, 2021

(65) Prior Publication Data
US 2023/0010586 A1    Jan. 12, 2023

(51) Int. Cl.
*H01M 10/42* (2006.01)
*G01N 17/02* (2006.01)
(Continued)

(52) U.S. Cl.
CPC ....... *H01M 10/4228* (2013.01); *H01M 10/06* (2013.01); *H01M 10/30* (2013.01);
(Continued)

(58) Field of Classification Search
CPC .. H01M 10/4228; H01M 10/06; H01M 10/30; H01M 10/425; H01M 10/482;
(Continued)

(56) References Cited

U.S. PATENT DOCUMENTS 5,464,701 A  *  11/1995  Rey ..................... H01M 50/114
                                                    429/177
5,824,883 A     10/1998  Park et al.
8,211,559 B1    7/2012   Waggoner

FOREIGN PATENT DOCUMENTS

| CN | 208458942 | * | 2/2019 |
| JP | 2002-251985 A | | 9/2002 |
| JP | 2014063663 | * | 4/2014 |

OTHER PUBLICATIONS

International Search Report for PCT/IB2019/001385 dated, Jul. 22, 2020 (PCT/ISA/210).
(Continued)

*Primary Examiner* — Lisa S Park
(74) *Attorney, Agent, or Firm* — Sughrue Mion, PLLC

(57) ABSTRACT

The invention deals with a sensor for sensing electrolyte creepage in a battery, a circuit comprising such sensor, and a battery connected to such circuit, with an application to an electrical circuit comprising the sensor and connecting a monitoring equipment to a to battery.

Figure 1:
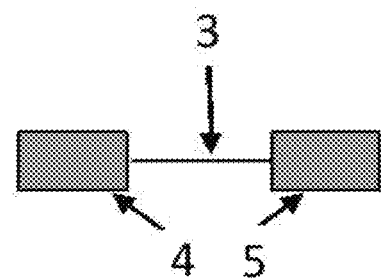

The sensor element is adapted for being connected within an electrical circuit 1 connected to a battery 2, said battery comprising one or more electrochemical cells containing an electrolyte, wherein the sensor element comprises a electrical conductor element whose at least one electrical property varies when in contact with the electrolyte, such as to allow, when the sensor element is connected in a circuit, detection of an electrolyte creepage from a an electrochemical element (Continued)

of a battery 2 connected to the circuit 1 by measurement of the variation of the one electrical property of the conductor element.

13 Claims, 1 Drawing Sheet

(51) Int. Cl.
  *H01M 10/06* (2006.01)
  *H01M 10/30* (2006.01)
  *H01M 10/48* (2006.01)
  *H01M 50/569* (2021.01)
(52) U.S. Cl.
  CPC ....... *H01M 10/425* (2013.01); *H01M 10/482* (2013.01); *H01M 10/484* (2013.01); *H01M 10/486* (2013.01); *H01M 50/569* (2021.01)
(58) Field of Classification Search
  CPC ............. H01M 10/484; H01M 10/486; H01M 50/569; G01N 17/02; Y02E 60/10; H02J 7/0047
  See application file for complete search history.

(56) References Cited

OTHER PUBLICATIONS

Written Opinion of the International Searching Authority for PCT/IB2019/001385 dated, Jul. 22, 2020 (PCT/ISA/237).

\* cited by examiner

ELECTROLYTE SENSOR FOR SENSING ELECTROLYTE CREEPAGE IN A BATTERY

CROSS REFERENCE TO RELATED APPLICATIONS

This application is a National Stage of International Application No. PCT/IB2019/001385 filed Dec. 6, 2019.

FIELD OF THE INVENTION

The invention deals with an electrolyte sensor for sensing electrolyte creepage in a battery, a circuit comprising such sensor, and a battery connected to such circuit, with an application to an electrical circuit comprising the sensor and connecting a monitoring equipment to a battery.

BACKGROUND OF THE INVENTION

A battery generally comprises one or more electrochemical cells, each of which defining a volume in which an electrolyte impregnated electrochemical bundle is disposed. It is known that electrolyte creepage may cause severe damages to the battery or to the surrounding equipment. As a matter of fact, the electrolyte is highly conductive and may cause electrical short circuits. Besides, the electrolyte is also very chemically aggressive to many materials, and may therefore cause severe corrosion damages. Battery installations may catch fire, and the surrounding equipment, such as electronic devices, may be damaged, because of an electrolyte creepage.

This can be particularly acute in the case where the battery comes with a monitoring equipment or system, which can involve a large number of cables connected to electrochemical cell terminals. Indeed, each connection between the monitoring equipment and the electrochemical cells terminals may be affected by an electrolyte creepage. Thus, the risk of fault due to electrolyte creepage increases with the number of connections with the electrochemical cell terminals. It is therefore important to detect electrolyte creepage in these circumstances.

It is known, from document JP2002251985, to use an epoxy board comprising two copper tracks. These copper tracks become electrically connected when electrolyte becomes present on the epoxy board due to an electrolyte creepage from the battery, thus allowing the current to flow from one track to the other. This current can be sensed to inform about the electrolyte creepage. However, the board is not disposed outside the electrochemical cells of the battery, but inside the battery pack itself, which affects the battery manufacturing process and the way the electrolyte creepage can be sensed. Besides, the epoxy board works as an electrical switch which is open when no electrical creepage is present and closed when electrolyte creepage occurs. It involves therefore to set up a specific electrical circuit independent from any other circuit used inside or outside the battery, dedicated to sensing the presence of the electrolyte creepage related current.

SUMMARY OF THE INVENTION

The aim of the invention is to solve at least the problems presented above. Thus, the invention aims at proposing a sensor element that allows detection of presence of electrolyte in electrical equipment surrounding a battery, such as due to electrolyte creepage in said battery, which does not affect the manufacturing of the battery and which may be easily integrated in an existing electrical circuit connected to the battery.

The object of the invention is therefore, according to a first aspect, a sensor element adapted for being connected within an electrical circuit connected to a battery, such as an electrical circuit connecting a monitoring system to said battery, said battery comprising one or more electrochemical cells containing an electrolyte, wherein the sensor element comprises a electrical conductor element whose at least one electrical property varies when in contact with the electrolyte, such as to allow, when the sensor element is connected in a circuit, detection of an electrolyte creepage from an electrochemical element of a battery connected to the circuit by measurement of the variation of the one electrical property of the conductor element.

According to some embodiments, the sensor element comprises further one or more of the following features, considered alone or according to any technically possible combination:
- the one electrical property of the electrical conductor element varies with the corrosion due to the contact between said conductor element with the electrolyte;
- the one electrical property of the electrical conductor element is the conductivity, said conductivity decreasing with the contact between the conductor element and the electrolyte, or the electrical resistance, said electrical resistance increasing with the contact between the conductor element and the electrolyte;
- the one electrical property can also vary when temperature increases around the conductor element, such as to allow, when the sensor element is connected in a circuit, detection of an increase of temperature by measurement of the variation of the one electrical property of the conductor element;
- the one electrical property of the electrical conductor element is the conductivity, said conductivity increasing when the surrounding temperature of the conductor element increases, or the electrical resistance, said electrical resistance decreasing when the surrounding temperature of the conductor element increases;
- the sensor element further comprises an electrolyte barrier means, such as to avoid, when the sensor element is connected to an electrical circuit, propagation of an electrolyte creepage from a battery connected to said electrical circuit;
- the sensor element further comprises two ends, each of said ends being equipped with connection means configured to be respectively connected to two connections points of an electrical circuit, such as an end of a first wire and an end of a second wire of said electrical circuit, one of said connection points being configured to be connected to a battery;
- the conductor element is a wire, or a foil or a metallic conductive path on a substrate;
- the conductor element is enclosed into an electrically insulating enclosure;
- the material of the conductor element is one of, or a combination of: aluminum, copper, magnesium, zinc, tin, or vanadium dioxide;
- the one electrical property of the conductor element varies when in contact with any kind of alkaline electrolyte, such as a NiCd, NiFe, NiZn, NiMH or lead-acid electrolyte.

The object of the invention is also, according to a second aspect, a circuit, such as monitoring circuit in a battery monitoring equipment, comprising at least one sensor element as presented above, and measurement means connected to the sensor element and configured to measure the variation of the one electrical property of the conductor element.

The object of the invention is also, according to a third aspect, a battery comprising one or more electrochemical elements containing an electrolyte, said battery being connected to an electrical circuit as presented above, such as an electrical circuit of a battery monitoring equipment, such that an electrolyte creepage from the battery may be sensed by the sensor element in the circuit before it propagates further into said circuit.

In a specific embodiment, the sensor element in the circuit is such that a temperature increase due to the battery may be sensed by the sensor element in the circuit.

The sensor element of the invention allows therefore to detect an electrolyte creepage in a battery, when integrated in an electrical circuit such that an electrical circuit of a monitoring equipment connected to the battery, without requiring modification in the manufacturing process of the battery, and without requiring to set up a specific electrical circuit for such a creepage detection.

DRAWINGS

Figure 2:
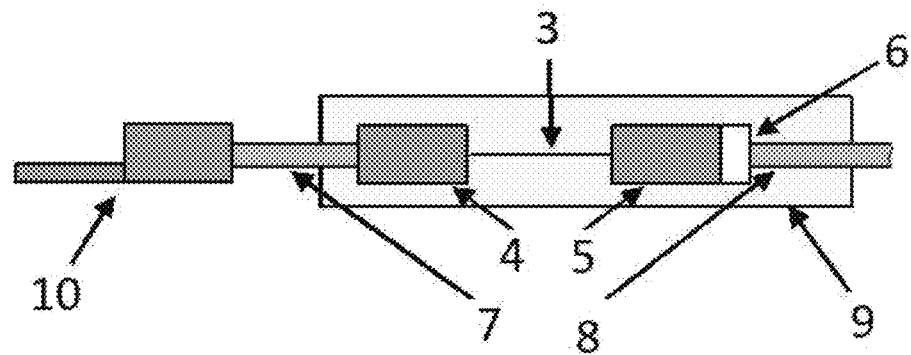
Figure 3:
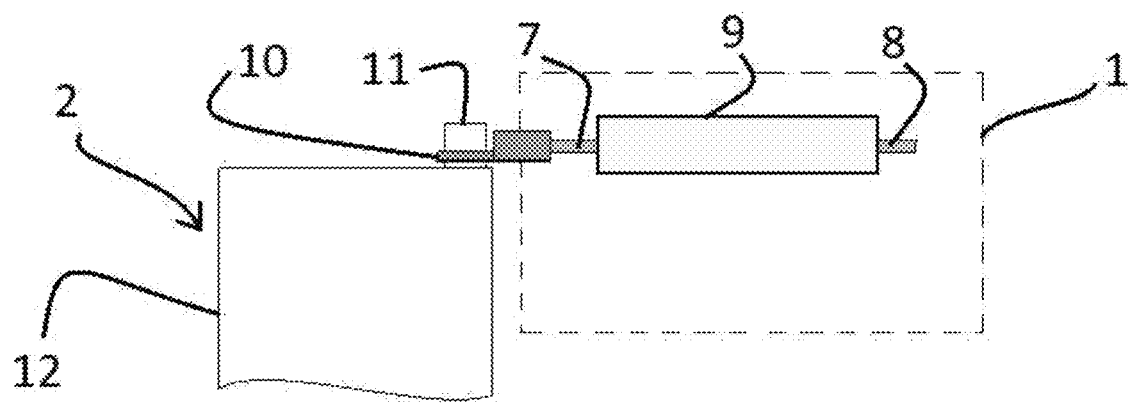

The invention and its advantages may be better understood by referring to the description which follows, given as example and for illustrative purpose only, and by referring to:

FIG. 1: schematic representation of an example of sensor element of the invention;

FIG. 2: schematic representation of an example of sensor element of the invention integrated into an electrical circuit of the invention;

FIG. 3: schematic representation of an electrical circuit of the invention connected to a battery

DETAILED DESCRIPTION

As can be seen in FIG. 3, the sensor element is adapted for being connected within an electrical circuit 1 connected to a battery 2 comprising one or more electrochemical cells containing an electrolyte, such as a NiCd electrolyte. Any kind of alkaline electrolyte, such as a NiFe, NiZn, NiMH or lead-acid electrolyte, may also be used. This circuit can be for example an electrical circuit 1 connecting a monitoring system to the battery 2.

FIGS. 1 and 2 give more details of the sensor element in some specific embodiments. The sensor element exemplified in these figures comprises an electrical conductor element 3. This conductor element 3 can be for example an electrically conductive wire 3.

The conductor element 3 preferably comprises, or is made of, aluminum, copper, magnesium, zinc, tin, or vanadium dioxide, or a combination of these material.

The electrical properties of the conductor element 3 are such that at least one of these electrical properties varies when in contact with the electrolyte. When the sensor element is connected in a circuit 1 as shown in the example of FIG. 3, or partially in the example of FIG. 2, an electrolyte creepage that would occur from one of the electrochemical elements of the battery 2 connected to the circuit 1, can be detected. The detection is obtained by measurement of the variation of the one electrical property of the conductor element.

Thus, the sensor element can detect electrolyte creepage to indicate that service is required, such as replacement of the equipment in order to avoid severe damages.

In a preferred embodiment, the electrical property in question varies with the corrosion of the conductor element 3 which occurs due to the contact between this conductor element 3 with the electrolyte.

Preferably, the material of the conductor element 3 is a material that provides good conductivity and corrodes rapidly when in contact with the electrolyte. When this electrolyte is of the NiCd type as mentioned above, aluminum gives good results in these terms (good conductivity, quick corrosion due to NiCd electrolyte).

For example, the conductivity of the conductor element 3 decreases when the conductor element 3 is in contact with the electrolyte. This conductivity can be measured and the decrease can be detected.

Also, the electrical resistance of the conductor element 3 increases when the conductor element 3 is in contact with the electrolyte. This electrical resistance can be measured and the increase can be detected.

In a test example, with alkaline (NiCd or NiZn) electrolytes or lead-acid electrolyte the applicant measured substantial electrical resistance variations, with a multiplying factor of 1000 (example: variation from 1 kOhm before electrolyte creepage to 1 MOhm after electrolyte creepage).

In the case where the conductor element 3 comprises, or is made of, vanadium dioxide, the variation of the electrical property in question can also be related to a variation of the temperature surrounding the conductor element 3, such as an increase of this temperature. Such an increase of temperature surrounding the conductor element 3 can be caused by an increase of temperature from the battery 2 itself.

More specifically, the conductivity of the conductor element 3 increases when the surrounding temperature increases, and the electrical resistance of this conductor element 3 decreases when the surrounding temperature increases. Therefore, by measuring the variation of the electrical property in question, such as the conductivity or the electrical resistance, of the conductor element 3, one can also detect an increase of the temperature of the battery 2 itself, which can be representative of an abnormal condition of the battery 2.

As can be seen in FIG. 2, an electrolyte barrier means 6 can be added, such as to avoid, when the sensor element is connected to the electrical circuit 1, propagation of the electrolyte creepage from the battery 2 connected to the electrical circuit 1 (see FIG. 3). The electrolyte barrier 6 can contain, or be made of, a glue, or a material of the epoxy type.

As shown in more details in the examples of FIGS. 1 and 2, the sensor element comprises two ends 4, 5. Each of these ends 4, 5 is equipped with connection means. This connection means are configured to be respectively connected to two connection points 7, 8 of an electrical circuit 1, visible in FIGS. 2 and 3. These connection points 7, 8 can be respectively an end 7 of a first wire and an end 8 of a second wire of the electrical circuit 1. In order to simplify the representation, the first wire is also referred with reference numeral 7, and the second wire is also referred with reference numeral 8.

One of the two connection points 7, 8 (connection point 7 in the example of FIGS. 2 and 3), is more precisely configured to be connected to a battery 2, for example through a cable lug 10 which connects to one of the terminals 11 outside of the envelope 12 of the battery 2.

In this configuration, and as exemplified on FIG. 2, the electrolyte barrier means 6 mentioned above can be located at the other end of the sensor element, meaning at the end 5, opposite to the end 4 oriented towards the battery 2.

Preferably, the conductor element 3, possibly up to the two ends 4, 5, is enclosed into an electrically insulating enclosure 9, such as a box 9 or a thermo-retractable sheath.

A measurement means (not represented in the figures), connected to the sensor element in the circuit 1, allows measurement of variation of the electrical property in question of the conductor element 3.

Thus, when the electrical circuit 1 connected to the battery 2, such as an electrical circuit 1 of a battery monitoring equipment, contains the sensor element as described above, and when an electrolyte creepage occurs from the battery 2, the latter is sensed by the sensor element before it propagates further into the electrical circuit 1, avoiding damages and dysfunction of the circuit 1.

In the case where the measured electrical property variation is related to a temperature increase surrounding the conductor element 3 of the sensor element, a temperature increase due to the battery 2 may also be sensed by the sensor element in the circuit 1. This will alert before damages due to temperature increase of the battery 2 occur.

The above description has been directed to specific embodiments of this invention which is, however, not limited to these embodiments described for purpose of example only.

In particular, the invention is not limited to the configuration where the electrical circuit 1 is an electrical circuit 1 of a battery monitoring equipment.

The invention claimed is:

1. A set comprising:
   a battery,
   an electrical circuit, and
   a sensor element being connected within the electrical circuit, the electrical circuit being connected to the battery, said battery comprising one or more electrochemical cells containing an electrolyte, wherein the sensor element is an electrical conductor element which is a wire wholly enclosed into an electrically insulating enclosure, wherein
   the sensor element comprises two ends, each of said ends being equipped with connection means respectively connected to two connections points of the electrical circuit, the two connection points being an end of a first wire and an end of a second wire of the electrical circuit, one of said connection points being mechanically connected through a cable lug to a terminal of an electrochemical cell of the battery, and wherein at least one electrical property of the electrical conductor element varies when in contact with the electrolyte, such as to allow detection of an electrolyte creepage from an electrochemical cell of the battery by measurement of the variation of the one electrical property of the electrical conductor element.

2. The set according to claim 1, wherein the one electrical property of the electrical conductor element varies with corrosion due to contact between said electrical conductor element with the electrolyte.

3. The set according to claim 1, wherein the one electrical property of the electrical conductor element is the conductivity, said conductivity decreasing with the contact between the electrical conductor element and the electrolyte, or the electrical resistance, said electrical resistance increasing with the contact between the electrical conductor element and the electrolyte.

4. The set according to claim 1, wherein the sensor further comprises an electrolyte barrier means, such as to avoid, propagation of an electrolyte creepage from the battery connected to said electrical circuit.

5. The set according to claim 1, wherein the material of the electrical conductor element is one of, or a combination of: aluminum, copper, magnesium, zinc, tin, or vanadium dioxide.

6. The set according to claim 5, wherein the one electrical property varies also when temperature increases around the electrical conductor element, such as to allow detection of an increase of temperature by measurement of the variation of the one electrical property of the electrical conductor element.

7. The set according to claim 6, wherein the one electrical property of the electrical conductor element is the conductivity, said conductivity increasing when the surrounding temperature of the electrical conductor element increases, or the electrical resistance, said electrical resistance decreasing when the surrounding temperature of the electrical conductor element increases.

8. The set according to claim 1, comprising measurement means connected to the sensor element and configured to measure the variation of the one electrical property of the electrical conductor element.

9. The set according to claim 8, such that an electrolyte creepage from the battery may be sensed by the sensor element in the electrical circuit before it propagates further into said electrical circuit.

10. The set according to claim 9, wherein the material of the electrical conductor element is one of, or a combination of: aluminum, copper, magnesium, zinc, tin, or vanadium dioxide and wherein the one electrical property varies also when temperature increases around the electrical conductor element, such as to allow, when the sensor element is connected in a circuit, detection of an increase of temperature by measurement of the variation of the one electrical property of the electrical conductor element.

11. The set according to claim 9, wherein the electrochemical cells are of the alkaline type, such as NiCd, NiFe, NiMH or NiZn type.

12. The set according to claim 9, wherein the electrochemical cells are of the lead-acid type.

13. The set according to claim 1, further comprising a battery monitoring equipment and the sensor element is part of the battery monitoring equipment.

* * * * *